Feb. 17, 1948.      S. S. CHEITEN      2,436,035
TOILET FLUSH TANK VALVE
Filed May 16, 1946
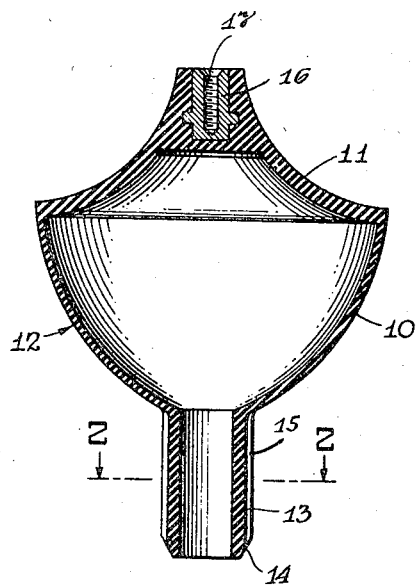
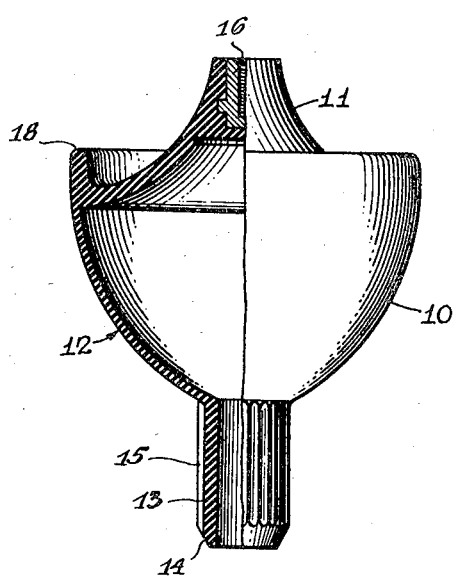
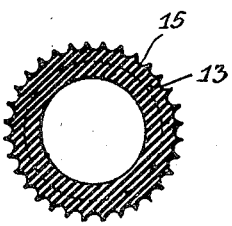
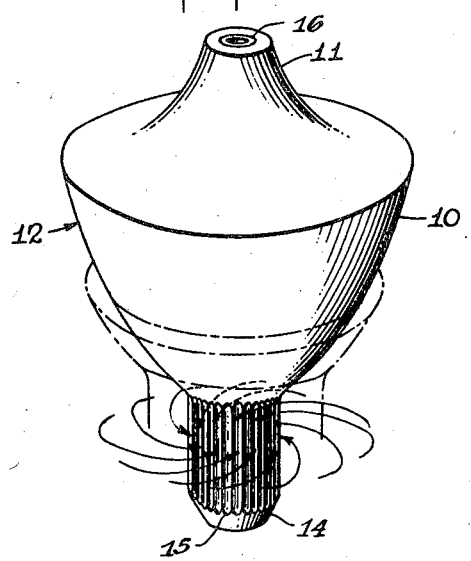
INVENTOR
Samuel S. Cheiten
BY
Angelo M. Pisarra
ATTORNEY Patented Feb. 17, 1948

2,436,035

UNITED STATES PATENT OFFICE 2,436,035

TOILET FLUSH TANK VALVE

Samuel S. Cheiten, Highland Park, N. J.

Application May 16, 1946, Serial No. 670,224

2 Claims. (Cl. 4—56)

This invention relates to valves and more particularly to flush valves or closet tank balls finding application especially in toilet tanks. In its more specific aspect this invention is directed to improvements in the flush tank valves or balls heretofore commonly employed.

The improved flush valve or ball of the present invention is of simple and rugged construction and may be manufactured at reasonable cost. It has long life, positive action and substantially uniform wearing characteristics.

The foregoing as well as other advantages and objects of this invention will be more readily apparent from the following description and accompanying drawings, wherein:

Figure 1 is a cross sectional view taken vertically through a flush tank valve or ball embodying my invention.

Figure 2 is a cross sectional view taken on line 2—2 of Figure 1.

Figure 3 is a perspective view of the invention shown in Figures 1 and 2 and illustrates the position of the various parts thereof with respect to a valve seat shown in dotted lines.

Figure 4 is a perspective view, partly in cross section taken vertically on a modification of the embodiment of my invention as shown in Figures 1-3.

As shown in the drawings the novel and improved flush tank valve or ball comprises a generally convex or spherical lower portion 10 having a generally conical upper portion 11 integral with each other to provide a hollow valve 12. The hollow valve 12 is preferably composed of a rubbery material, such as natural rubber, reclaimed rubber or of any of the so-called synthetic rubbers commonly known as Buna S and Buna N and respectively composed of copolymers of butadiene and styrene and of butadiene and acrylonitrile. The lower portion 10 has a central opening therethrough. Integral with the portion 10 at said opening and depending therefrom is a hollow cylinder or stem 13 also composed of a rubbery or resilient material. The outside diameter of lower portion 10 at the midaltitude thereof is approximately three times the outside diameter of the stem 13 and the ratio of the altitude of portion 10 to the length of stem 13 is between about 10 to 7 and 10 to 11 and preferably approximately 10 to 9. As shown in the drawings the outside lower marginal face of stem 13 is beveled to provide a beveled leading end 14. The stem 13 has a plurality of parallel elongated vertical grooves 15 on the outside thereof to provide a fluted outer face. Locked in the upper end of the top portion 11 is a connector 16 having a vertically disposed hollow portion whose interior surface is threaded at 17.

The modification shown in Figure 4 is the same as that shown in Figures 1 to 3 but has an additional element, namely an upstanding lip or annular flange 18 integral with the top 11 and bottom portion 10. The lip 18 is preferably composed of the same material as the top 11 and bottom 10.

Through the connector 16, the novel tank ball or valve may be readily coupled to the threaded lower end of a guide and lifting stem not shown. The threading at the lower end of the guide and lifting stem and at 17 of the connector 16 is preferably so chosen that upon rotation of the valve 12 in a counter-clockwise direction, the connector 16 will be tightened onto the lower end of the guide lift not shown.

By employing the invention as shown and heretofore described, it is apparent that the stem 13 serves as a centering element and also is acted upon by the force of the water discharge at its vortex due to the arrangement and proportioning of the parts to provide an improved tank ball or valve.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim:

1. A flush tank valve comprising a flexible convex bottom portion and an upper closure portion, said valve being hollow and having an opening through said bottom portion, a hollow stem secured to and depending from said bottom at said opening, the outside surface of said stem having a plurality of elongated grooves therein.

2. A flush tank valve comprising a flexible convex bottom portion and an upper closure portion, said valve being hollow and having an opening through said bottom portion, a hollow stem secured to and depending from said bottom at said opening, the outside surface of said stem having a plurality of elongated grooves therein, the lower outer marginal end of said stem being beveled, the ratio of the outside diameter of said bottom portion at the mid-altitude thereof to the outside diameter of said stem being approximately 3 to 1 and the ratio of the altitude of said bottom portion to the length of said stem being in the range of 10 to 7 and 10 to 11.

SAMUEL S. CHEITEN.

REFERENCES CITED

The following references are of record in the file of this patent:

UNITED STATES PATENTS

| Number | Name | Date |
|---|---|---|
| 895,742 | Freshour | Aug. 11, 1908 |
| 1,528,098 | Crane | Mar. 3, 1925 |